O. L. McDONALD & G. MAPES.
SUCKER ROD.
APPLICATION FILED JULY 24, 1911.
1,013,036.
Patented Dec. 26, 1911.
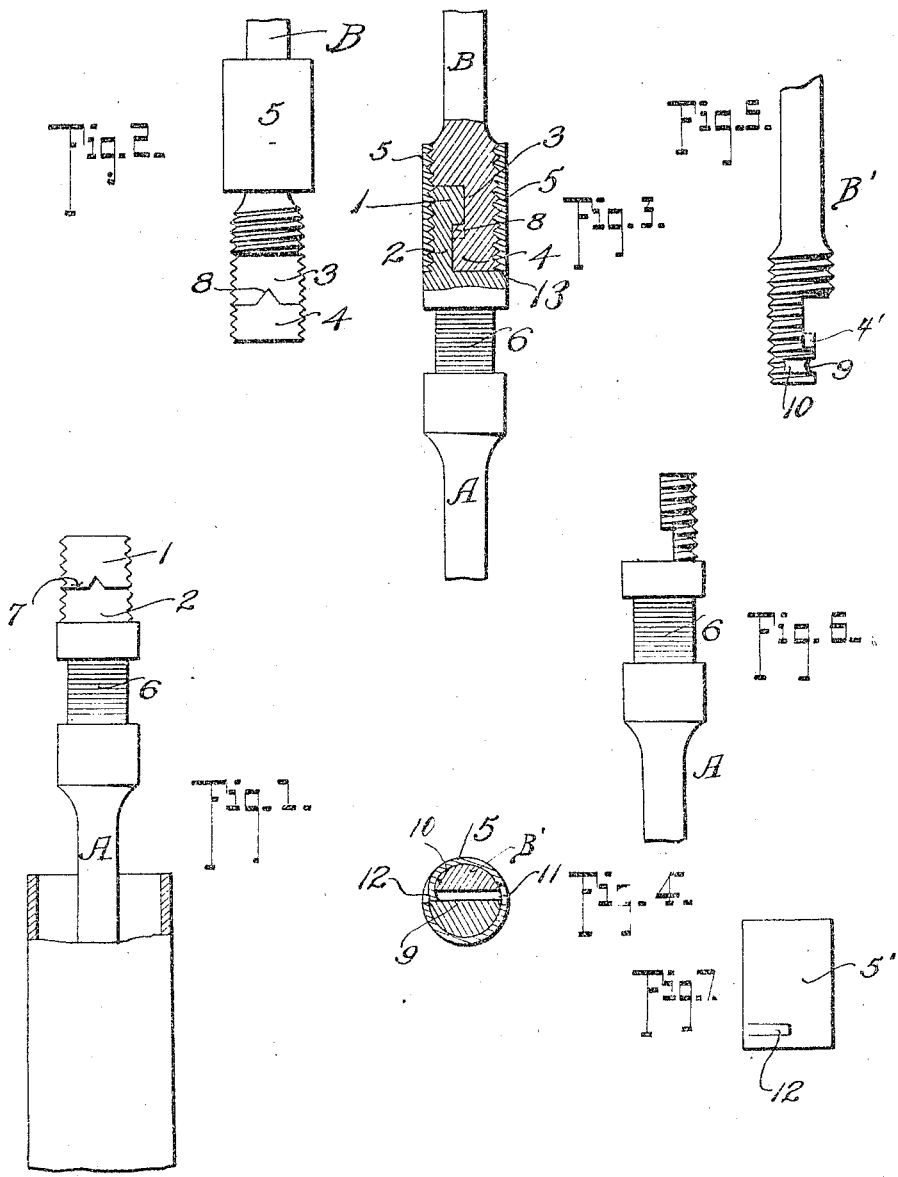

UNITED STATES PATENT OFFICE.

OWEN L. McDONALD AND GEORGE MAPES, OF TAFT, CALIFORNIA.

SUCKER-ROD.

1,013,036.  Specification of Letters Patent.  Patented Dec. 26, 1911.

Application filed July 24, 1911. Serial No. 640,201.

*To all whom it may concern:*

Be it known that we, OWEN L. McDONALD and GEORGE MAPES, citizens of the United States, residing at Taft, in the county of Kern and State of California, have invented certain new and useful Improvements in Sucker-Rods, of which the following is a specification.

This invention relates to couplings for sucker rods.

In oil fields and other places where pumps are used in deep wells requiring great lengths of sucker rods, the same are generally composed of several sections, and it has been difficult to secure a satisfactory coupling joint for the same.

An object of this invention is to provide a coupling joint having peculiar locking means preventing the same from jarring loose in the use thereof.

Another object is to provide a joint which may be easily and quickly assembled and taken apart, combining strength and efficiency in use.

With the above and other objects in view, this invention consists in the construction, combination, and arrangement of parts, all as hereinafter more fully described, claimed, and illustrated in the accompanying drawings, wherein—

Figure 1 is a side elevation of one portion of a sucker rod provided with the present invention; Fig. 2 is a view of the opposite portion of the joint; Fig. 3 is a longitudinal section; Fig. 4 is a transverse section of a modified form; Fig. 5 is a side view of a portion of the sucker rod used therein; Fig. 6 is a side view of the parts shown in Fig. 1; and Fig. 7 is a side elevation of the sleeve employed in the modified form.

Throughout the following detail description and on the several figures of the drawings, similar parts are referred to by like reference characters.

The rod portion A illustrated in Fig. 1 has a projection 1 and a recess 2, said projection and recess engaging with the recess and projection 3 and 4 of the part B illustrated in Fig. 2. A threaded sleeve 5 is then run down over the threads carried by the rod ends adjoining, as above described, in assembling the same. To facilitate this operation, the rod A has a square portion 6 which may be gripped by a wrench or a suitable tool.

In order that the sleeve 5 may be readily entered onto the threads of the rod A, peculiar means are provided which will be disclosed hereinafter. At the transverse bearing shoulder 7 of the rod A is provided a V-shaped groove which in assembling the joint will engage a corresponding V-shaped projection 8 carried by the rod portion B. This will bring the rod ends in alinement facilitating the entering of the sleeve, the threads of which should snugly fit the exterior threads of the rod ends. Considering the great length of the rods, it would require considerable care and effort to bring out this alinement; hence, the great advantage of the above described feature.

In the modified form, peculiar locking means for the threaded sleeve 5' is provided. The projection 4' of the rod section B' is provided with a transverse groove 9 and a notch or recess 10, the purpose of which will appear hereinafter.

At one side of the sleeve 5' is cut an opening 11 to correspond with the transverse groove 9 of the rod portion B' when the sleeve is properly located over the joint of said rod portions A' and B'. The sleeve 5' has a U-shaped cut in the same providing a free locking tongue or lug 12, said tongue 12 being forced inwardly into the recess 10, and thereby locking the sleeve securely on the joint. Thus there will be no possibility of the same working loose in the use of the rod. When it is desired to take apart the joint, the lug 12 may be readily forced out of engagement with the groove 10 by a pin entered through the groove 9 and the opening 11 of the sleeve 5'.

In the preferred form, the sleeve 5 is turned to positively engage with the shoulder 13 of the rod portion A, thereby giving greater rigidity to the joint.

Having thus fully described our invention, what is claimed as new is:—

1. In a sucker rod coupling, a pair of rod sections having interlocking lugs and recesses, a transverse bearing formed thereby, a V-shaped groove and projection formed in said transverse bearing, and a locking sleeve engageable over said rod sections.

2. In a sucker rod coupling, a pair of rod sections having interlocking recesses and lugs thereby forming a transverse bearing shoulder, one of said lugs having a transverse groove, a recess formed adjacent to said groove, a threaded sleeve engageable over said sucker rod sections, said sleeve having U-shaped cut through one side thereof, thereby forming a locking tongue adapted to engage the aforesaid recess adjacent to the aforesaid groove, and an opening in the side of the sleeve opposite said tongue, said tongue and opening coinciding with the aforesaid transverse groove, so that the tongue can be forced out of its locking position.

In testimony whereof we affix our signatures in presence of two witnesses.

OWEN L. McDONALD.
GEORGE MAPES.

Witnesses:
E. C. BARKETT,
MILES A. FITZGERALD.